ELECTROKINETIC-TRANSDUCING DEVICES

Filed Dec. 3, 1953 2 Sheets-Sheet 1

INVENTOR.
EDWARD V. HARDWAY, JR.
BY
Stone, Boyden & Mack
ATTORNEYS.

INVENTOR
EDWARD V. HARDWAY, JR.

BY Stone, Boyden + Mack
ATTORNEYS.

2,782,394

ELECTROKINETIC-TRANSDUCING DEVICES

Edward V. Hardway, Jr., Richmond, Va., assignor, by mesne assignments, to Consolidated Electrodynamics Corporation, Pasadena, Calif., a corporation of California Application December 3, 1953, Serial No. 395,892

40 Claims. (Cl. 340—13)

This invention relates to transducing devices and particularly to such devices which may be employed as hydrophones or for similar purposes.

Several types of transducing devices have been proposed in the prior art, and among these the piezoelectric and the electromagnetic types have been most frequently employed. Numerous attempts have been made to use conventional transducing devices in pressure sensitive hydrophones, particularly for use in off-shore seismic detectors for response to low frequency sound pressures at considerable depths. In this situation, the transducers are used in groups of 12–24 detectors connected through long cables to suitable amplifying and recording equipment. Since the cables have appreciable resistance and capacity and are subject to leakage, the use of low impedance is necessary.

It has been found the piezoelectric transducers readily withstand hydrostatic pressures, but because of the high circuit impedances necessary for low frequency operation of piezoelectric devices, it is essential that pre-amplifiers be employed near the hydrophones. The cable problem necessarily becomes difficult to handle because of the large number of conductors required. Further, since their output impedance is a function of frequency, piezoelectric devices cannot be readily matched by transformers to long cables.

Electromagnetic transducing devices are also not satisfactory for low frequency hydrophones, and like applications. First, such devices are inherently velocity-responsive rather than pressure-sensitive. Since these devices have a low mechanical impedance when designed to operate properly at low frequencies, they must have high internal compliance, so that there is a serious problem, even under moderate hydrostatic pressures, of pressure equalization. The responsive element must have sufficient compliance to be displaced by very weak sound pressures and yet not be displaced excessively by hydrostatic pressures, often several million times greater in magnitude. Pressure equalization has been attempted by means of flexible bellows, bladders, and the like, but these arrangements are subject to leaks and to compacting with sand or mud if drawn along the ocean floor.

In its preferred form, the present invention is directed to transducing devices employing porous plug electrokinetic cells of the type disclosed in my Patents Numbers 2,644,900 and 2,644,902, issued July 7, 1953, and my Patent #2,661,430, issued December 1, 1953. I have discovered that such electrokinetic devices are admirably suited for use in hydrophone and like applications. Electrokinetic devices of this type have a resistive electrical impedance which is independent of frequency and allows electrical impedance matching, by use of stepdown transformers, to long cables, so that the deleterious effects of cable capacity and parallel resistance caused by leaks in cable insulation are greatly reduced. Because such devices have a very high resistive mechanical impedance, which may run, for example, roughly 100 times greater than the characteristic acoustic impedance of water, their use makes possible incorporation in the transducer of pressure multiplying means to greatly increase the power output of the device. Further, the higher mechanical resistance of this type of transducing unit allows use of simple, self-contained, relatively small pressure equalizing means.

Accordingly, one object of the present invention is to provide improved transducing devices employing electrokinetic cells of the type hereinbefore mentioned, and overcoming the disadvantages inherent in the electromagnetic and piezoelectric devices heretofore employed.

A further object is to provide a non-directional, pressure-sensitive transducing device suitable for underwater use and for like applications and which is less expensive to manufacture and is more reliable in operation than equivalent prior art devices.

Another object is to provide a completely sealed hydrophone of relatively small size incorporating very simple and efficient means for equalization of hydrostatic pressure within the device and so eliminating the bladders and bellows heretofore usually employed for this purpose.

Another object of the invention is to provide novel means for increasing the output of a unitary transducing device, thereby increasing voltage sensitivity of the device.

A still further object of the invention is to provide, in devices of the type referred to, safety means automatically preventing application to the transducing unit of excessive transient pressures which might damage the unit and are not indicative of the phenomenon being detected.

Yet another object is to provide improved devices of the class described including means for mechanical impedance matching to increase the sensitivity of the device.

In order that these and other objects of the invention may be understood in detail, reference is made to the accompanying drawings which form a part of this specification and wherein.

Figure 1:
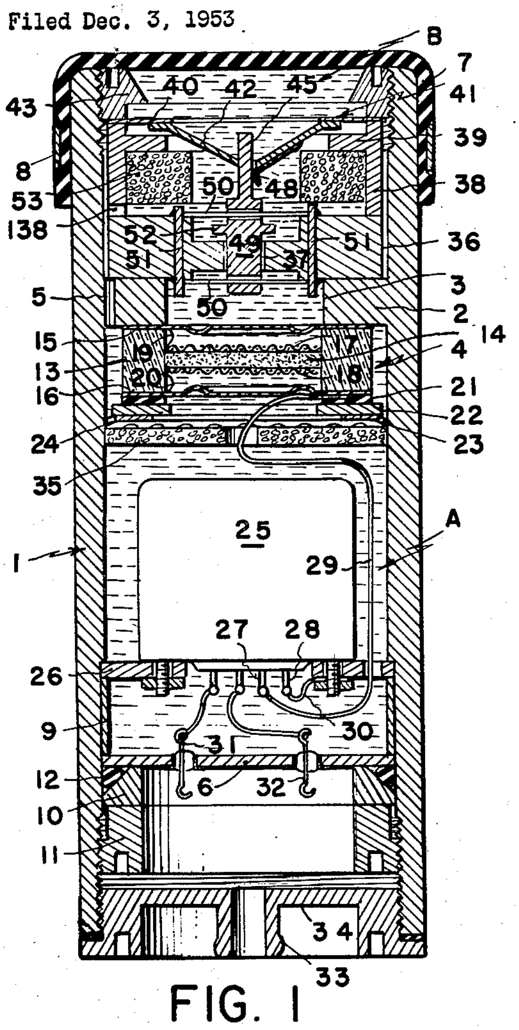
Fig. 1 is a longitudinal sectional view of a hydrophone constructed in accordance with one embodiment of the invention.

Referring now to the drawings in detail, and first to Fig. 1 thereof, it will be seen that the embodiment of the invention here illustrated comprises a generally cylindrical housing 1 having an interior bore which is divided into two chambers by a partition 2. The partition 2 has a central opening 3, which opening is closed by an electrokinetic cell 4, and is also provided with a small passage or aperture 5. The lower chamber, designated as A, is closed by a rigid sealing partition 6, while the upper chamber, designated at B, is closed by a deformable wall portion 7. The deformable wall portion 7 may be provided simply by securing a cup of synthetic rubber or the like across the end of the housing 1 by means of an annular clamp 8. The partition 6 is held against a spacer 9 by means of ring 10, and a clamping ring 11, the latter being threaded to the bore of the housing, an O-ring 12 being provided as shown to seal the partition against the passage of liquid.

The electrokinetic cell 4 is of the porous plug type disclosed in my aforementioned patents. Thus, the cell 4 comprises an electrical insulating ring 13 having an interior bore closed by a porous ceramic plug 14, which plug acts as a porous dam within the cell. Secured across the ends of the ring 13 are flexible metallic diaphragms 15 and 16, the diaphragm 15 being clamped against the partition 5 and having a central or working area registered with the opening 3 of the partition 2. There are thus provided two chambers within the cell 4, one located on each side of the plug 14 and each closed by one of the diaphragms 15 and 16. Positioned in each of these chambers is a wire mesh electrode 17, 18, each electrode being connected to the corresponding metallic diaphragm, as shown, by means of metal foil strips 19 and 20. Each chamber of the cell 4 is completely filled with a suitable electrokinetic liquid, such as acetonitrile.

The cell 4 is held in place by mounting means comprising a compliant annular gasket 21 lying against the rim of the diaphragm 16, a metal washer 22, and a force fit clamping ring 23. The clamping ring 23 is provided with at least one opening or aperture 24, as shown, to allow liquid to pass by the cell mounting means.

Since the partition 6 is rigid and sealed against liquid flow, and since the aperture 24 and the passage 5 are so small as to appear as barriers to sound energy, the chamber A is acoustically isolated. On the other hand, the chamber B is in pressure communication with the exterior of the housing 1 via the deformable wall portion 7. Also, it will be noted that provision is made for passage of liquid between the two chambers, via the passages 138 and 5 and the port 24, to equalize any difference in hydrostatic pressure between the chambers.

As fully described in my Patent 2,661,430, and my Patents 2,644,900 and 2,644,902, the cell 4 is self-generating, providing an electrical signal which is proportional to varying pressure applied to one of the cell diaphragms. Thus, if a pressure is applied to the diaphragm 15, which, as will be explained, is the pressure-receiving diaphragm in the present device, electrokinetic liquid in the cell will be forced through the porous plug 14 and there will result a potential difference between the electrodes 17 and 18, the magnitude of this potential difference depending upon the magnitude of the pressure and the sense of the potential difference depending upon the direction of flow of the electrokinetic liquid.

In the chamber A, I provide a transformer 25 secured in any suitable manner to a transversely extending partition 26. The input or primary terminals 27 and 28 of the transformer 25 are connected respectively to the electrode 18, via conductor 29, and to electrode 17, via conductor 30, the metal housing 1, and the partition 2. The output or secondary terminals of the transformer 25 are connected to sealed lead-through conductors 31 and 32 which are supported on, but insulated from, the partition 6, the conductors 31 and 32 being in turn connected to a suitable insulated cable, not shown, extending through and sealed in the boss 33 on the closure plug 34. Thus, the output signal of the cell 4 is supplied to the transformer 25 and thence to the main instrument cable, not shown.

It is inherent in the operation of the cell 4 that, if a pressure be applied to diaphragm 15, and the diaphragm 15 be distorted by such pressure, the opposite diaphragm 16 must be similarly distorted. In order that the diaphragm may move, even though the housing 1 is entirely filled with liquid, I provide in the chamber A a compressible body 35, which body will afford volumetric compliance for the cell 4. Thus, if a changing pressure distorts the cell diaphragm, the body 35 will be correspondingly compressed into a smaller volume. The body 35 may be of any suitable compressible, substantially non-absorbent, material having sufficient resilience to return to its normal volume upon decrease of liquid pressure in the instrument. I find that I may employ for this purpose bodies formed of cork particles surrounded by a continuous matrix of rubber, synthetic rubber or other elastomer. Such cork-filled elastomer bodies may provide, for example, a compression of approximately 33% under pressures on the order of one hundred and fifty to two hundred and fifty pounds per square inch.

As has been stated, the diaphragm 15 is the pressure-receiving diaphragm of the cell 4, and is in pressure communication with the exterior of the housing 1 as will now be described. Situated in chamber B adjacent the partition 2 is a second partition 36 which is of considerable thickness adjacent its periphery, but the central portion of which is reduced in thickness and provided with an opening 37 aligned with the cell 4. The partition 36 is engaged and held in position by a generally tubular member 38 having an inwardly directed annular shoulder 39. Overlying the end of the generally tubular member 38 is the annular rim portion 40 of a response diaphragm 41, the diaphragm 41 including a centrally disposed, substantially rigid, conical portion 42. A clamping ring 43, threaded into the end of the bore of housing 1, engages the annular rim portion 40 of the diaphragm opposite the member 38, thus securing in place the diaphragm, the member 38, and the partition 36.

Figure 3:
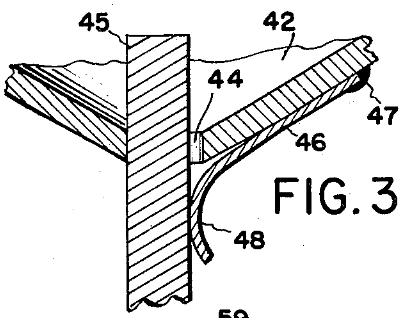
Fig. 3 is a fragmentary longitudinal sectional view showing in detail a frictional slip joint employed in the device of Fig. 1.

The annular rim portion 40 of the response diaphragm is flexible, and, since the diaphragm as a whole constitutes a liquid barrier, pressures received from the exterior of the housing 1 will cause the diaphragm to move along the axis of the housing, resiliency of the rim portion 40 serving to return the diaphragm to a normal, relaxed position upon the cessation of such pressures. As best seen in Fig. 3, the central portion 42 of the response diaphragm is provided with an aperture 44, and this aperture receives an operating shaft 45. The diameter of the shaft 45 is somewhat smaller than that of the aperture 44, so that there would ordinarily be freedom of movement between the diaphragm and the shaft. To connect these two elements, I provide a frictional slip joint consisting of a spring member 46 soldered at one end 47 to the diaphragm and terminating at its opposite end in a curved finger 48 which bears against the shaft 45, forcing the shaft against the periphery of the opening 44, as shown.

Joined to the end of the shaft 45 nearest the cell 4 is a piston 49, the arrangement being such that the piston is positioned for reciprocation in opening 37 of partition 36. The piston 49 is mounted concentrically in the opening 37 by means of a plurality of resilient wires 50 secured to and extending radially outward from the piston to terminate in mounting posts 51 secured in the partition 36. As seen in Fig. 1, two sets of these radially extending mounting wires are provided, one set being situated on each side of the partition 36. At a point on the side of the partition 36 opposite the cell 4, the piston 49 is provided with an annular flange 52.

The entire cavity defined by the housing 1, the deformable member 7, and the barrier 6 is filled with liquid. The filling liquid may be an oil of predetermined viscosity and I prefer to employ a 2000 centistoke silicone oil.

It will be noted that the working area of the piston 49 is materially smaller than that of the diaphragm 41. Thus, the diaphragm 41 and the piston 49 constitute a hydraulic pressure multiplier for applying pressures to the diaphragm 15 of the cell 4. The response diaphragm 41 is in pressure communication with the exterior of the housing through the deformable wall member 7. Pressure changes within a normal operating range are applied to the response diaphragm via the liquid filling in the housing 1 so that the diaphragm is moved in accordance with the pressure change, such movement being imparted to the shaft 45 and the piston 49, so that a greater pressure is generated within the space defined by the opening 3 of partition 2, this greater pressure flexing the diaphragm 15 of the cell 4 inwardly to cause the electrokinetic liquid in the cell to flow through the porous plug 14.

Since the entire interior cavity of the housing 1 is liquid-filled, some compliance means must be provided to allow movement of the response diaphragm 41. To accomplish this, I provide the compressible member 53, such member being held in place within the tubular member 38. Again, as was the case with compressible member 35, the member 53 may be of cork-filled elastomer.

The deformable wall member 7 acts as a thin boundary between the liquid filling within the housing 1 and the medium, such as the sea, within which the instrument is immersed. Static and dynamic pressures are substantially equal on both sides of the deformable wall portion 7, but sound energy passes therethrough so that pressures are applied to the response diaphragm and thus transmitted to the cell 4.

The deformable wall portion 7 serves to allow for the changes in volume in the compressible members under both dynamic and hydrostatic pressure, and in the change in oil volume due to the difference between the coefficients of thermal expansion between the oil and the metal parts.

The compressible members 35 and 53 also serve to provide volumetric compliance necessary in the equalization of hydrostatic pressures throughout the instrument. It will be noted that all portions of the interior of the housing 1 are in communication through small ports and passages. Thus, liquid may flow from one side of the response diaphragm to the other through the aperture 44. Similarly, liquid may flow past the piston 49, since the mounting wires 50 serve to hold the piston 49 concentrically within the opening 37 of partition 36, the diameter of the piston 49 being slightly smaller than that of the opening 37. Also, liquid may flow past the cell 4 by reason of the port 24 and the passage 5, the latter passage communicating with a space around the periphery of the partition 36. Thus, if the instrument is employed as a hydrophone and is progressively lowered into the sea, the hydrostatic pressure on the outside of the instrument will continually increase, resulting in deformation of the wall portion 7 and an increase in the hydrostatic pressure within the chamber B, so that momentarily the pressure tends to be higher in chamber B than in chamber A. This hydrostatic pressure difference is, however, immediately equalized by the slow flow of liquid from chamber B into chamber A through the ports and passages mentioned, there being a resulting compression of the members 53 and 35 during such action. As to relatively slowly changing hydrostatic pressures, the port and passages mentioned provide for free flow of liquid. But, as to relatively rapidly changing pressures, as are involved in acoustic energy, these ports and passages appear as a barrier and have no practical effect. It will be noted that the spring element 46, Fig. 3, provides a slip joint between the response diaphragm and the shaft 45, so that abrupt excessive forces on the diaphragm will result in slippage between the diaphragm and the shaft. In order that excessive pressure of short or long duration shall not result in a diaphragm travel so large as to damage the diaphragm or the cell 4, I provide the shoulder 39, Fig. 1, which is positioned under the periphery of the substantially rigid central portion 42 of the response diaphragm. Thus, the inward movement of the response diaphragm is limited. When such an unduly large pressure exists, the flow of liquid through the relatively small aperture 44 is limited, thus protecting the cell from such pressure. Because of this limited flow, time is allowed for the pressure to equalize on both sides of the cell. It will be understood that in the case of a transient pressure, the diaphragm 41 will recover quickly because of the opposing pressure exerted by the compressible body 53. When the pressure is prolonged, rather than transient, the filling liquid has time to flow through the aperture 44 and equalize the pressure on both sides of the response diaphragm, so that the diaphragm may return to its normal position, pressures throughout the instrument then being equalized, as hereinbefore described. In order that the piston 49 may not be forced so far toward the cell 4 as to generate a pressure which would damage the cell, I provide stop means comprising the annular flange 52, this flange engaging the face of the partition 36 and preventing further inward movement of the piston. It will be understood that, regardless of the nature of any excessive pressure which may occur and cause slippage in the joint between the shaft 45 and the response diaphragm 41, the resilient nature of portion 40 of the diaphragm and of the mounting wires for the piston 49 will cause the diaphragm and the piston to return to their normal position after the pressure has been expended or equalized.

To summarize the operation of the embodiment of the invention just described, let it be assumed that the device is employed as a hydrophone and is completely immersed in a body of water subjected to sonic or other disturbances to be detected. Assuming that a sonic disturbance occurs, the resulting varying pressure will be received by the response diaphragm 41 through the deformable portion 7. Thus, at one instant, the response diaphragm 42 will be forced toward the cell 4, carrying with it the piston 49, so that an increased pressure is generated within the cavity between piston 49 and diaphragm 15 of the cell 4. Such pressure will force the diaphragm 15 inwardly causing a flow of electrokinetic fluid through the porous plug 14, and thus establishing between the electrodes 17 and 18 a potential difference proportional to the pressure change. Inward motion of the diaphragm 41 is allowed by a corresponding compression of the compressible body 53; similarly, flexing of the diaphragms 15 and 16 of the cell 4 is allowed by the compliance afforded by compressible body 35. Inward motion of the response diaphragm is also accompanied by distortion of the resilient rim portion 40 thereof and by distortion of the mounting wires 50 of the piston 49. As the pressure which caused the inward motion of the diaphragm 41 decays, the compressible bodies 35 and 53, and the resilient elements 40 and 50, will return to their normal position, so that the diaphragm and the piston are also returned to normal position. Relaxation of the diaphragms 15 and 16 of cell 4 result in a flow of electrokinetic liquid back through the porous plug 14, so that a potential difference is established between the electrodes 17 and 18 which is in the opposite sense to the potential difference first mentioned. Thus upon occurrence of a sonic disturbance in the medium surrounding the instrument, the hydraulic pressure multiplying means comprising the response diaphragm 41 and the piston 49 functions to place the cell 4 under a cyclically varying pressure corresponding to the wave form of the sonic disturbance, and the cell 4 serves to generate an alternating electrical signal which is applied to the primary of transformer 25 and corresponds to the wave form of the sonic disturbance.

In ordinary use, the device will be employed to detect disturbance of relatively small magnitude having a frequency greater than a cycle per second. It has been pointed out that such disturbances result in pressures applied to the response diaphragm 41 and hence to the cell 4, and that such pressures are opposed by forces resulting from compression of the compressible members 35 and 53 and from distortion of the resilient elements 40 and 50. It should be noted that, within the useful frequency range of the instrument, the motions resulting from the application of such pressures are quite small and the opposing and restoring forces resulting within the instrument are negligible as compared to the applied pressures on the response diaphragm. The effects of the stiffness of the compliant elements are effectively added to the stiffness of the diaphragms 15 and 16 of the cell 4 and are small in comparison with the very high mechanical flow resistance presented by the porous disc 14. Such relationship is analyzed mathematically in my Patent Number 2,661,430 above referred to.

Figure 2:
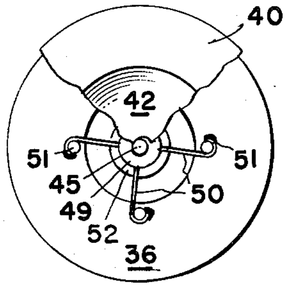
Fig. 2 is a fragmentary plan view illustrating certain parts of the device of Fig. 1 in detail.

In the device described with reference to Figs. 1–3, it will be understood that the voltage sensitivity is proportional to the area ratios employed in the hydraulic pressure multiplying or mechanical impedance matching means. It will also be evident that the power sensitivity will vary in proportion to the fourth power of the diameter ratio in the hydraulic pressure multiplying means. As the pressure multiplication factor is increased, the corresponding movement of the response diaphragm will increase, requiring a greater amount of compliance in the compressible ring 53, for the same useful frequency range. In that instance, a greater deformation of the deformable wall portion 7 will also be necessary for the same hydrostatic pressure.

Figure 4:
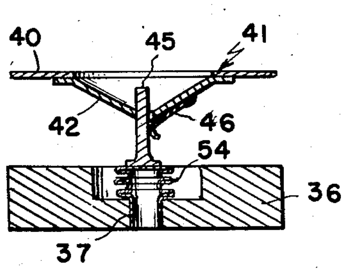
Fig. 4 is a fragmentary longitudinal view showing certain parts of the device of Fig. 1 in modified form.

In place of the piston 49 of the pressure multiplier, I may employ a flexible bellows, as shown in Fig. 4. In this modification, the response diaphragm 41 and its slip connection to the shaft 45 remain unchanged. However, instead of being connected to a piston, the shaft 45 is connected to the sealed end of a cup-shaped bellows 54, the open end of the bellows being secured to partition 36 in sealing relation to close the opening 37. Again, the working area of the bellows 54 is materially smaller than the working area of the response diaphragm 41, so that the combination functions as a hydraulic pressure multiplier in the same manner as described with reference to Fig. 1.

Figure 5:
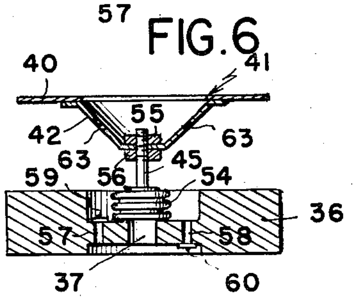
Fig. 5 is a view similar to Fig. 4 and showing a further modification of such parts.

In the embodiments of Figs. 1 and 4, I have employed a mechanical slip joint to protect the instrument from excessive pressures. As seen in Fig. 5, I may eliminate this slip joint in favor of a hydraulic relief system serving the same purpose. Here, the overall combination of response diaphragm 41, operating shaft 45, bellows 54 and partition 36 remains the same, except that the shaft 45 is rigidly connected to the conical portion 42 of the response diaphragm, as by means of clamping nuts 55 and 56. I provide a pair of passages 57 and 58 through the partition 36 and arranged in hydraulic parallel with the opening 37. These passages are equipped with suitable flap-type relief valves 59 and 60, respectively, the two valves being arranged in opposition to each other.

Figure 6:
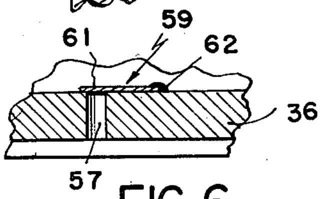
Fig. 6 is a detail sectional view of a valve arrangement which may be employed in the structure of Fig. 5.

Thus, the valve 59 will allow hydraulic flow away from the cell 4, while the valve 60 will allow flow only toward the cell 4. As seen in Fig. 6, each valve may comprise a resilient metal sheet 69 soldered directly at one end to the face of the partition 36, as indicated at 62. The metal members 61 of the valves are so chosen that their resilience is such as to allow the valve to open only upon occurrence of a pressure of predetermined magnitude. Thus, in operation, the valves 59 and 60 open selectively to prevent excessive pressures on the electrokinetic cell 4 in either direction but do not open at normal sound pressure levels. Since the aperture at the apex of the response diaphragm has been eliminated in the embodiment shown in Fig. 5, I provide apertures 63 to allow slow equalization of the pressures on opposite sides of the response diaphragm.

Figure 7:
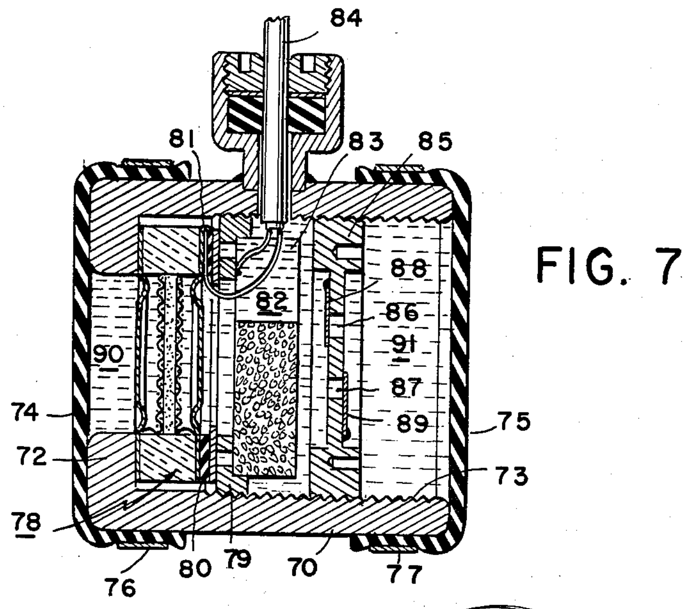
Fig. 7 is a longitudinal sectional view of a hydrophone constructed in accordance with another embodiment of the invention.
Figures 8, 9, 10:
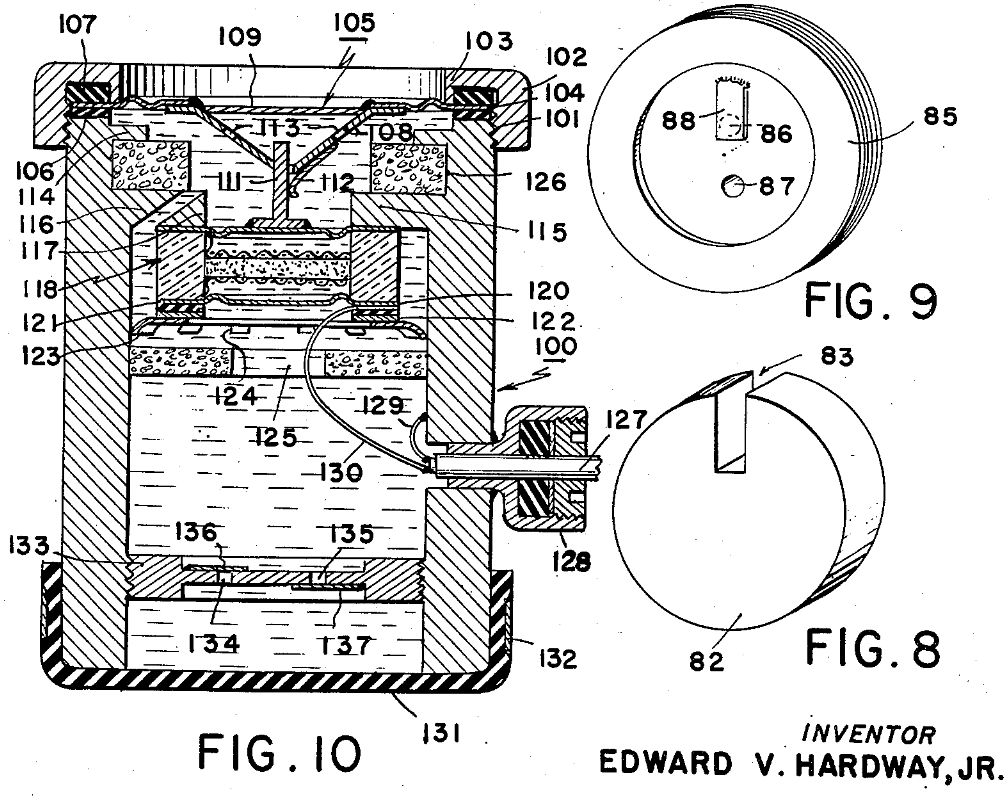
Fig. 8 is a perspective view of a compressible element employed in the device of Fig. 7.
Fig. 9 is a perspective view of a partition member employed in the device of Fig. 7 and equipped with valve controlled pressure equalization ports.
Fig. 10 is a fragmentary longitudinal sectional view illustrating another embodiment of the invention similar to that shown in Fig. 1.

Turning now to the embodiment shown in Figs. 7–9, there is illustrated here a simpler form of my invention, adapted again for use as a hydrophone, wherein there is no provision for pressure multiplication, and wherein a parallel valve system such as is shown in Fig. 5 is employed for equalization of hydrostatic pressures within the device. This embodiment of the invention is applicable to very low frequency measurements, well below a cycle per second.

The device includes a cylindrical metal housing 70 provided at one end with an inturned flange 72, the other end being open and provided with internal threads 73. Synthetic rubber or like cups 74 and 75, secured across the two ends of the housing by means of annular clamps 76 and 77, respectively, provide two opposed deformable wall portions for the housing. Positioned within the housing against the inturned flange 72 is an electrokinetic cell 78 which is in all respects like cell 4 of Fig. 1. The cell 78 is held in place by means of a threaded backing disc 79 and a metal ring 80, a compliant gasket 81 being positioned between the backing ring 79 and the cell 78, as shown. On its side opposite the cell 78, the backing ring 79 is provided with a shallow circular recess in which is mounted a compressible body 82. The body 82 is provided with a slot 83 to accommodate the two conductors of an insulated cable 84. One conductor of the cable 84 is connected directly to the metal backing ring 79, and thus through the housing 70 to one electrode of the cell 78. The other conductor of the cable 84 is clamped between the compliant gasket 81 and the adjacent metal diaphragm of the cell 78, so as to be connected to the other electrode of the cell 78. The cable 84 may enter the housing 70 through any suitable sealed connection, as shown, and such a sealed connection may, of course, be employed also in the embodiment of Fig. 1.

Situated within the housing 70 between the compressible member 82 and the deformable wall portion 75 is an externally threaded partition disc 85 provided within a pair of ports 86 and 87. A flap-type valve 88 is operatively associated with the port 86, and a like valve 89 is associated with the port 87, the two relief valves being arranged in hydraulic opposition to each other. The housing 70 is entirely filled with a suitable liquid, preferably a relatively viscous silicone oil.

It will be noted that one side of the cell 78 is in pressure communication with the exterior of the housing via the chamber 90. The interior cavity of the housing 70 on the opposite side of the cell 78, however, is acoustically isolated by reason of the partition 85. In operation, the device is immersed in a liquid medium subjected to sonic or like disturbances to be detected, such disturbances resulting in the application of pressures to the cell 78 through the deformable wall portion 74 and the oil-filled chamber 90. The cell 78 responds to such varying pressures in the manner heretofore described with reference to cell 4, Fig. 1. The compressible body 82 affords volumetric compliance for the cell 78, so that the diaphragms of the cell may be displaced even though the entire interior of the housing 70 is liquid-filled. It will be obvious that the chambers 90 and 91 will be at substantially equal hydrostatic pressures regardless of the depth at which the hydrophone is immersed. However, the intermediate chamber, in which the body 82 is positioned, would not be at such pressure were it not for the valve system provided in partition 85. As the device is lowered into the water or other liquid medium, and the pressure on the outside of the casing correspondingly increases, the valve 88 will open to allow flow of the filling liquid through the port 86 in order to equalize hydrostatic pressures throughout the entire device and compensate for the partial compression of the body 82. On the other hand, as the pressure outside of the housing falls below the internal pressure, valve 89 will open to allow flow of the filling liquid out into the chamber 91 again, to accomplish pressure equalization as body 82 expands. Of course, the valves 88 and 89 are constructed to open at a pressure sufficiently high that the valves are not affected by normal operation of the cell 78.

In the embodiment discussed with reference to Fig. 1, it will be noted that the deformable wall portion, which deflects to provide pressure equalization, is on the same side of the electrokinetic cell as is the receiving diaphragm of the cell. In the embodiment of Fig. 7, however, it is wall portion 75, on the side of the cell opposite the receiving diaphragm, which deflects to provide pressure equalization. It will be understood, referring again to Fig. 7, that the deformable wall member 74 serves only to protect the interior parts of the device from exposure and corrosion, and may be eliminated by design, as herein after indicated. Deformable wall portion 75, however, is essential to operation of this particular embodiment.

In Figs. 1, 4, and 5, I have shown hydraulic pressure multiplying means comprising the combination of a response diaphragm, a movable member in the nature of either a piston or bellows, and an operating shaft interconnecting the two. In Fig. 10, there is shown a somewhat similar arrangement wherein one diaphragm of the electrokinetic cell is employed as the movable member acting with the response diaphragm to function as a hydraulic pressure multiplier. This embodiment of the invention is further characterised by the fact that the response diaphragm seals one chamber of the instrument and is in direct contact with the medium in which the instrument is to operate.

This embodiment comprises a generally tubular metal housing 100 exteriorally threaded at one end as indicated at 101. Threaded onto this end of the housing is an end cap 102 having an inturned flange 103 overlying and spaced from the end space of the housing. Clamped between the flange 103 and the end face of the housing is the resilient rim portion 104 of a response diaphragm assembly 105, suitable sealing gaskets 106 and 107 being provided on each side of the rim portion 104 as shown. The annular resilient rim portion 104 extends inwardly to join the base of a conical central diaphragm member 108 and a circular closure disc 109, this assembly being completed by soldering as shown. The conical portion 108 is provided with a suitable aperture at its apex, and an operating shaft 111 extends through this aperture as shown. To connect the operating shaft and the conical portion of the response diaphragm assembly. I provide a spring finger 112 bearing against the shaft 111 and so causing the shaft to be forced against the periphery of the aperture in the apex of member 108 to effect a slip joint connection. In order that the response diaphragm and the operating shaft may move relatively to each other more easily when slippage is necessary, I provide ports 113 in the conical portion 108, through which the filling liquid within the housing 100 may also pass. To limit the inward travel of the response diaphragm, I provide an annular shoulder 114 lying beneath the rim or base of the conical portion 108.

Within the housing 100 is an annular inwardly directed shoulder 115 provided with a small passage 116, and defining a bore 117. The instrument again includes a porous plug type electrokinetic cell 118 in all respects similar to the cell 4, Fig. 1. The cell 118 is provided with face diaphragms 119 and 120, and is so mounted that the rim portion of the diaphragm 119 is clamped against the annular shoulder 115. The inner end of the operating shaft 111 is secured directly to the diaphragm 119, as shown. The cell 118 may be secured in place by mounting means similar to that shown in Fig. 1, and including a compliant gasket 121 bearing against the diaphragm 120, a metal washer 122, and a force-fit clamping ring 123. The clamping ring 123 may be of the same type shown in Fig. 1 and includes, about its periphery, a number of fingers so that at least one port 124 is provided to allow flow of the filling liquid past the cell.

To afford volumetric compliance for the cell 118, I provide adjacent the clamping ring 123 a compressible body 125, which again may be of cork-filled elastomer. Similarly, to allow movement of the response diaphragm 105, I provide, between the cell 118 and the response diaphragm, a compressible body 126.

A two conductor insulated cable 127 enters the housing 100 through any suitable sealed fitting 128, the conductors 129 and 130 of this cable being connected respectively to the diaphragms of cell 118 in any suitable manner.

The remaining end of the housing 100 is sealed by a synthetic rubber or like cup 131 fixed in place by an annular clamp 132. In order that the interior of the housing 100 adjacent the diaphragm 120 of cell 118 may be acoustically isolated, I provide between the deformable wall portion 131 and the cell 118 an acoustic barrier in the nature of a partition 133. The partition 133 is provided with a pair of ports 134 and 135, relief valves 136 and 137 being associated with these ports in the same manner as described with reference to Fig. 7. It will thus be seen that, while the diaphragm 119 of the electrokinetic cell is in pressure communication with the exterior of the housing via the pressure multiplying system including operating shaft 111 and the response diaphragm, the opposite cell diaphragm 120 is acoustically isolated. Yet, the deformable wall portion 131 will deflect to compensate for changes in hydrostatic pressure and for pressure changes resulting from changing temperatures, the deformable wall portion 131 being in communication with all portions of the interior of the instrument via passages 134 and 135, ports 124, passage 116, and apertures 113, as well as through the aperture in the apex of member 108. It will be understood that the overall operation of the embodiment shown in Fig. 10 is similar to that of the embodiment described with reference to Fig. 1.

It will be noted that in all of the embodiments of this invention the interior of the instrument is completely filled with an inert insulating liquid. The novel arrangement which allows the use of a complete filling of inert oil or the like thus eliminates completely the disadvantages of prior art devices which employed external sealed gas or air-filled volumes. It will be understood that in such prior art devices, it has been very difficult to employ perfect seals and the devices were accordingly subject to leaks after being immersed for long periods in sea water or the like, so that damage to the instrument and malfunctioning were quite common. By employing an electrokinetic cell in a housing completely filled with oil or the like, I am able to completely avoid such disadvantages of the prior art.

It will be understood that the high flow resistance of the electrokinetic cell facilitates use of a completely oil-filled instrument. This characteristic of the electrokinetic cell has another very important advantage, however, in that it makes possible hydraulic pressure multiplication within the instrument even in the low frequency range necessary in seismic exploration.

It will be noted that the embodiments of the invention hereinbefore specifically described achieve acoustic isolation between two chambers, as between chambers A and B in Fig. 1, and that I have disclosed means such as the ports and passages 138, 5 and 24, Fig. 1, or the flapper valve-equipped passages of Figs. 5, 6 and 7, which permit hydrostatic pressures to substantially equalize. Such hydrostatic pressure equalizing means may be replaced by capillary tubes, porous plugs, and the like, depending upon the specific application.

I have disclosed a preferred compliant body comprising particles of cork in an elastomer matrix to afford volumetric compliance for the working parts of the device. For specific applications, it may be desirable to employ other compliant means to serve the function of the cork-neoprene body. Thus, for applications involving relatively high hydrostatic pressures, the compliant means may be simply a body of compressible silicone oil. For relatively low hydrostatic pressures, the compliant means may be a sealed, gas-filled rubber tube or bellows immersed in or in contact with the filling liquid of the instrument.

I claim.

1. In a transducing device, the combination of a liquid-tight housing, an electrokinetic cell mounted in said housing, and a compressible member situated in said housing on one side of said cell, said housing being filled with liquid and said compressible member affording volumetric compliance for said cell in accordance with its compressibility.

2. In a transducing device, the combination of a housing, a porous plug type electrokinetic cell mounted in said housing, said housing having an acoustically isolated chamber on one side of said cell and a second chamber on the opposite side of said cell, said second chamber being in pressure communication with the exterior of said housing, both of said chambers being filled with liquid, and compliance means in said acoustically isolated chamber to afford volumetric compliance for moving parts of said device.

3. In a transducing device, the combination of a sealed liquid-filled housing, a porous plug type electrokinetic cell mounted in said housing, the interior of said housing including an acoustically isolated chamber on one side of said cell and a second chamber on the other side of said cell in pressure communication with the exterior of said housing, means for hydrostatically equalizing said chambers, and compliance means situated in said housing to allow movement of the moving parts of said device.

4. In a hydrophone, the combination of a liquid-filled housing having a deformable wall portion, a porous plug type electrokinetic cell mounted in said housing, the interior of said housing comprising an acoustically isolated chamber on one side of said cell and a second chamber on the other side of said cell in pressure communication with the exterior of said housing, means communicating between said chambers to effect hydrostatic equalization of the interior of said housing, and a compressible body in said acoustically isolated chamber to afford volumetric compliance for said cell.

5. In a hydrophone, the combination of a liquid-filled housing having a deformable wall portion, a porous plug type electrokinetic cell mounted in said housing, the interior of said housing comprising an acoustically isolated chamber on one side of said cell and a second chamber on the other side of said cell, means communicating between said chambers to effect hydrostatic equalization of the interior of said housing, a response diaphragm mounted in said second chamber in pressure communication with the exterior of said housing, and compliance means situated between said diaphragm and said cell in contact with the liquid in the housing to allow movement of said diaphragm.

6. A hydrophone constructed in accordance with claim 5 and including second compliance means in said acoustically isolated chamber to provide volumetric compliance for said cell.

7. In a hydrophone, the combination of a liquid-filled housing having a deformable wall portion, a porous plug type electrokinetic cell mounted in said housing, the interior of said housing including an acoustically isolated chamber on one side of said cell and a second chamber on the other side of said cell, said deformable wall portion being in contact with the liquid in said second chamber, a response diaphragm mounted in said second chamber between said cell and said deformable wall portion, a compressible body disposed in said second chamber between said diaphragm and said cell to allow movement of said diaphragm, and means communicating between said chambers to effect hydrostatic equalization of the interior of said housing.

8. A hydrophone constructed in accordance with claim 7 and including a second compressible body in said acoustically isolated chamber to afford volumetric compliance for said cell.

9. In a hydrophone, the combination of a housing having a sealed liquid-filled cavity and a deformable wall portion in contact with the liquid in said cavity, a porous plug type electrokinetic cell mounted in said cavity, a response diaphragm mounted in said cavity between said cell and said deformable wall portion, a first compressible body situated in said cavity between said cell and said diaphragm, to allow movement of said diaphragm, and a second compressible body situated in said cavity on the side of said cell opposite said diaphragm to afford compliance for said cell.

10. A hydrophone constructed in accordance with claim 9 and in which said diaphragm and said cell are by-passed by relatively small apertures placing portions of said cavity in hydraulic communication to assure uniform hydrostatic pressure therein.

11. In a transducing device, the combination of a sealed liquid-filled housing, a porous plug type electrokinetic cell mounted in said housing, one side of said cell being in pressure communication with the exterior of said housing, and a compressible body of cork-filled elastomer situated in said housing in contact with the liquid therein to afford volumetric compliance for moving parts of said device.

12. In a hydrophone, the combination of a sealed liquid-filled housing, a porous plug type electrokinetic cell, means mounting said cell within said housing to effectively divide the interior of said housing into two chambers, said means including an aperture in hydraulic parallel with said cell to provide for equalization of hydrostatic pressures in said chambers, a wall portion of said housing in contact with the liquid in one of said chambers being deformable and exposed to contact with the medium in which the hydrophone is to operate, and a compressible body situated within the other of said chambers.

13. In a transducing device, the combination of a sealed liquid-filled housing, a porous plug type electrokinetic cell mounted in said housing, a response diaphragm mounted in said housing on one side of said cell, compliance means situated between said cell and said diaphragm to allow movement of said diaphragm, and means including said diaphragm and constituting a hydraulic pressure multipier for applying pressures to said cell.

14. In a hydrophone, the combination of a housing having an interior cavity sealed at one end by a deformable wall member and at the other by non-deformable means, a porous plug type electrokinetic cell, means mounting said cell within said housing and dividing said cavity into two chambers, both of said chambers being filled with liquid, hydraulic pressure multiplying means positioned in one of said chambers between said cell and said deformable wall member, and a compressible body situated in said one chamber to afford compliance for said pressure multiplying means.

15. A hydrophone constructed in accordance with claim 14 and wherein said means mounting said cell includes a passage arranged in hydraulic parallel with said cell to provide for equalization of hydrostatic pressures in said chambers.

16. In a hydrophone, the combination of a sealed liquid-filled cavity, a porous plug type electrokinetic cell mounted in said housing, a response diaphragm mounted in said housing on one side of said cell and in pressure communication with the exterior of said housing, a compressible body situated between said diaphragm and said cell, and means including said diaphragm and constituting a hydraulic pressure multiplier for transmitting pressures to said cell.

17. In a hydrophone, the combination of a housing having a sealed liquid-filled cavity and a deformable wall portion in contact with the liquid in said cavity, a porous plug type electrokinetic cell mounted in said cavity and dividing the same into two chambers, a response diaphragm mounted in one of said chambers between said cell and said deformable wall portion, means including said diaphragm and constituting a hydraulic pressure multiplier for transmitting pressures to said cell, a first compressible body situated in said one chamber between said diaphragm and said cell to allow movement of said diaphragm, and a second compressible body situated in the other of said chambers to provide compliance for said cell.

18. In a transducing device, the combination of a liquid-filled housing, a porous plug type electrokinetic cell mounted in said housing on one side of said cell and in pressure communication with the exterior of said housing, cylinder means positioned between said cell and said diaphragm, a piston, means mounting said piston for reciprocation in said cylinder means, the working area of said diaphragm being materially greater than the working area of said piston whereby said diaphragm and said piston constitute hydraulic pressure multiplying means for applying pressures to said cell, and compliance means situated between said diaphragm and cell to allow movement of said diaphragm.

19. A transducing device constructed in accordance with claim 18 and wherein said diaphragm and said piston are mechanically connected by means including a slip joint.

20. A transducing device constructed in accordance with claim 18 and including a compressible body situated within said housing on the side of said cell opposite said diaphragm to afford compliance for said cell.

21. In a transducing device, the combination of a housing having an interior liquid-filled cavity, a portion of said housing constituting a deformable wall member by which pressure changes may be imparted to the liquid in said cavity; a porous plug type electrokinetic cell; means mounting said cell within said housing and dividing said cavity into two chambers; a response diaphragm mounted in one of said chambers between said cell and said deformable wall member, a partition in said one chamber between said diaphragm and said cell, said partition being provided with an opening; a piston; resilient mounting means positioning said piston for reciprocation in said opening; means connecting said piston and said diaphragm, the working areas of said diaphragm and said piston being materially different whereby said diaphragm and piston constitute means for changing the magnitude of any pressure acting through said deformable wall member and for applying such changed pressure to said cell; and a compressible member situated within at least one of said chambers.

22. A transducing device constructed in accordance with claim 21 and wherein the working area of said piston is smaller than that of said diaphragm.

23. A transducing device constructed in accordance with claim 22 and wherein said resilient mounting means comprises a plurality of wires secured to and extending radially from said piston, said wires being attached to said partition at points radially removed from said piston and preventing contact between said piston and said partition.

24. In a transducing device, the combination of a sealed liquid-filled housing having a deformable wall portion, a porous plug type electrokinetic cell mounted in said housing, a compressible body situated in said housing in contact with the liquid therein to afford volumetric compliance for said cell, a liquid barrier disposed across the interior of said housing on one side of said cell and provided with a pair of ports for the passage of liquid, and a pair of relief valves each associated with a different one of said ports and arranged in opposition to each other.

25. A transducing device comprising a liquid-filled housing, a porous plug type electrokinetic cell mounted in said housing, a response diaphragm mounted in said housing on one side of said cell and in pressure communication with the exterior of said housing, a partition positioned between said cell and said diaphragm and having an opening, means cooperating with said diaphragm and opening to constitute a hydraulic pressure multiplier for applying pressures to said cell, and compliance means positioned between said diaphragm and partition to allow movement of said diaphragm, said partition being provided with a pair of relief valves each associated with a different one of said passages and arranged in opposition to each other.

26. A transducing device comprising a liquid-filled housing, a porous plug type electrokinetic cell mounted in said housing, a response diaphragm mounted in said housing on one side of said cell and in pressure communication with the exterior of said housing, a partition positioned between said diaphragm and said cell and provided with an opening, a flexible bellows having one sealed end and an open end secured to said partition to close said opening, the working areas of said diaphragm and bellows being materially different whereby said diaphragm and bellows constitute hydraulic pressure changing means, and a compressible member situated between said diaphragm and bellows to allow movement of said diaphragm.

27. A transducing device constructed in accordance with claim 26 and wherein the sealed end of said bellows is mechanically connected to said diaphragm by means including a slip joint.

28. A transducing device constructed in accordance with claim 26 and wherein said partition includes a pair of passages, said device including a pair of relief valves each associated with a different one of said passages and arranged in opposition to each other.

29. In a hydrophone, the combination of a liquid-filled housing, a porous plug type electrokinetic cell mounted in said housing, a response diaphragm mounted in said housing on one side of said cell and in pressure communication with the exterior of said housing, means including said diaphragm for multiplying the pressures applied to said diaphragm and applying such pressures to said cell, and means preventing application to said cell of pressures exceeding a predetermined maximum magnitude.

30. In a hydrophone, the combination of a liquid-filled housing, a porous plug type electrokinetic cell mounted in said housing, a response diaphragm mounted in said housing on one side of said cell and in pressure communication with the exterior of said housing, a movable member positioned between said diaphragm and said cell, and means mechanically coupling said diaphragm and movable member to provide a hydraulic pressure multiplier for applying pressures to said cell, said means being automatically disengageable in response to pressures on said diaphragm in excess of a predetermined maximum magnitude.

31. In a hydrophone, the combination of a liquid-filled housing, a porous plug type electrokinetic cell mounted in said housing, a response diaphragm mounted in said housing on one side of said cell and in pressure communication with the exterior of said housing, said diaphragm being provided with a central aperture, a shaft extending through said aperture, a spring finger connected to said diaphragm and bearing against said shaft to provide a slip joint between said diaphragm and said shaft, and movable means connected to said shaft and constituting with said diaphragm a hydraulic pressure multiplier for applying pressures to said cell.

32. In a hydrophone, the combination of a sealed housing having a deformable wall portion and an interior liquid-filled cavity, a porous plug type electrokinetic cell mounted in said cavity and dividing the same into two chambers, said deformable wall portion being in contact with the liquid in one of said chambers, an acoustic barrier disposed across said one chamber between said cell and said wall portion, a compressible body disposed in said one chamber between said cell and said barrier, and means allowing liquid flow through said barrier to effect hydrostatic equalization in said chamber, said cell being in pressure communication with the exterior of said housing through the other of said chamber.

33. In a hydrophone, the combination of a sealed housing having a deformable wall portion and an interior liquid-filled cavity, a porous plug type electrokinetic cell mounted in said cavity and dividing the same into two chambers, said deformable wall portion being in contact with the liquid in one of said chambers, an acoustic barrier disposed across one chamber between said cell and said deformable wall portion and including a pair of liquid passages, two relief valves each associated with one of said passages and arranged in opposition to each other, and a compressible body disposed in said chamber between said barrier and said cell, said cell being in pressure communication with the exterior of said housing through the other of said chambers.

34. In a hydrophone, the combination of a sealed housing having a deformable wall portion and an interior liquid-filled cavity, a porous plug type electrokinetic cell mounted in said cavity and dividing the same into two chambers, said deformable wall portion being in contact with the liquid in one of said chambers, an acoustic barrier disposed across the other of said chambers, a compressible body disposed in said other chamber between said cell and said barrier, and means allowing liquid flow through said barrier to effect hydrostatic equalization in said chamber.

35. In a hydrophone, the combination of a sealed housing having a deformable wall portion and an interior liquid-filled cavity, a porous plug type electrokinetic cell mounted in said cavity and dividing the same into two chambers, said deformable wall portion being in contact with the liquid in one of said chambers, an acoustic barrier disposed across the other of said chambers and including a pair of liquid passages, two relief valves each associated with one of said passages and arranged in opposition to each other, and a compressible body disposed in said other chamber between said cell and said barrier.

36. In a transducing device, the combination of a liquid-filled housing, a porous plug type electrokinetic cell mounted in said housing, a response diaphragm mounted in said housing on one side of said cell, partition means disposed between said cell and said diaphragm and provided with an opening, a piston positioned for reciprocation in said opening, mechanical means including a slip joint connecting said diaphragm and piston, the working areas of said diaphragm being materially larger than the working area of said piston whereby said diaphragm and piston constitute hydraulic pressure multiplying means for applying pressures to said cell, stop means carried by said piston for engagement with said partition means to limit the travel of said piston toward said cell and so cause slippage in said joint upon occurrence of excessive diaphragm travel, and compressible means situated between said diaphragm and said partition means to allow movement of said diaphragm.

37. In a transducing device, the combination of a liquid-filled housing, a porous plug type electrokinetic cell mounted in said housing, a response diaphragm mounted in said housing on one side of said cell, means including said diaphragm and constituting a hydraulic pressure multiplier for applying pressures to said cell, a compressible member situated between said diaphragm and said cell to allow movement of said diaphragm, and stop means arranged to limit the movement of said diaphragm toward said cell.

38. In a hydrophone, the combination of a sealed housing having a deformable wall portion; an electrokinetic cell mounted in said housing and comprising an insulating member having a bore, a porous insulating plug situated in said bore as a porous dam, and flexible diaphragm secured across each end of said bore, one of said diaphragms being in pressure communication with the exterior of said housing, said cell being filled with an electrokinetic liquid; said housing being completely filled with a liquid contacting both diaphragms of said cell and via which pressures are applied to said one diaphragm of the cell to force said electrokinetic liquid through said plug, and compressible means immersed in the liquid filling of said housing adjacent the other diaphragm of said cell to allow movement of said other diaphragm.

39. In a hydrophone, the combination of a sealed housing; an electrokinetic cell mounted in said housing and comprising an insulating member having a bore, a porous insulating plug disposed in said bore as a porous dam, and flexible diaphragms secured across each end of said bore, said cell being filled with an electrokinetic liquid; a response diaphragm mounted in said housing spaced from one diaphragm of said cell and in pressure communication with the exterior of said housing, said housing being filled with liquid and the liquid contacting both sides of said response diaphragm and both diaphragms of said cell, and compliance means in contact with said filling liquid to allow movement of said response diaphragm and the diaphragm of said cell.

40. In a transducing device, the combination of a liquid-tight housing, an electrokinetic cell mounted in said housing, said housing being filled with liquid, and compressible means submerged in the liquid in said housing on one side of said cell, the compressible means affording volumetric compliance for said cell in accordance with its compressibility.

References Cited in the file of this patent

UNITED STATES PATENTS

| | | |
|---|---|---|
| 2,498,990 | Fryklund | Feb. 28, 1950 |
| 2,615,940 | Williams | Oct. 28, 1952 |